United States Patent [19]

Pounds et al.

[11] Patent Number: 4,470,295
[45] Date of Patent: Sep. 11, 1984

[54] AUTOMATIC PIPE TESTING UNIT

[76] Inventors: Steve Pounds, Lafayette, La.;
William S. Romero, 661 Sydney Dr.,
St. Martin Parish, Breaux Bridge, La.
70517; Fred K. Bailey, executor of
said Steve Pounds, deceased

[21] Appl. No.: 381,438

[22] Filed: May 24, 1982

[51] Int. Cl.³ ............................................. G01M 3/28
[52] U.S. Cl. ........................................................ 73/49.5
[58] Field of Search ............... 73/49.1, 49.5, 49.6, 73/40.5 R

[56] References Cited

U.S. PATENT DOCUMENTS

| | | | |
|---|---|---|---|
| 3,710,628 | 1/1973 | Horton | 73/49.5 |
| 4,182,160 | 1/1980 | Powers et al. | 73/49.5 |
| 4,362,049 | 12/1982 | Horton | 73/49.1 X |

*Primary Examiner*—Gerald Goldberg
*Assistant Examiner*—Joseph W. Roskos
*Attorney, Agent, or Firm*—Thomas S. Keaty

[57] ABSTRACT

An automatic pipe testing unit adapted to be mounted on a goose-neck trailer and comprises a longitudinally extending rectangular tubing main trailer frame. A test fluid holding tank mounted on the frame has a screened opening to receive test fluid which is drained from each joint after it has been tested, so that the fluid can be continuously recirculated. Also included are hydraulically operated two lift arms and two pipe advance arms, the lift arms each having an integrally attached bevelled finger plate onto which a plurality of pipes can be rolled. The lift arms lift the pipes from one point to a slanted storage area on the top of the unit and herefrom automatically by operation of the hydraulic pipe advance arms, the pipe to be tested is advanced into a pipe gripping vise for testing. The hydraulically operated pipe advance arms can then be operated to eject the pipe therefrom into another area for draining the pipe of all of the test fluid so that the test fluid can be recirculated for subsequent use. The unit is further provided with end plates each having a sloped storage area for a multiple number of pipes to be tested, a U-shaped position to hold a pipe in position to be tested, a position to hold the last pipe tested while it drains all fluid contained therein back into the receiving trough and a ramp to allow the pipe to roll off after it has been ejected from the drain position.

15 Claims, 15 Drawing Figures

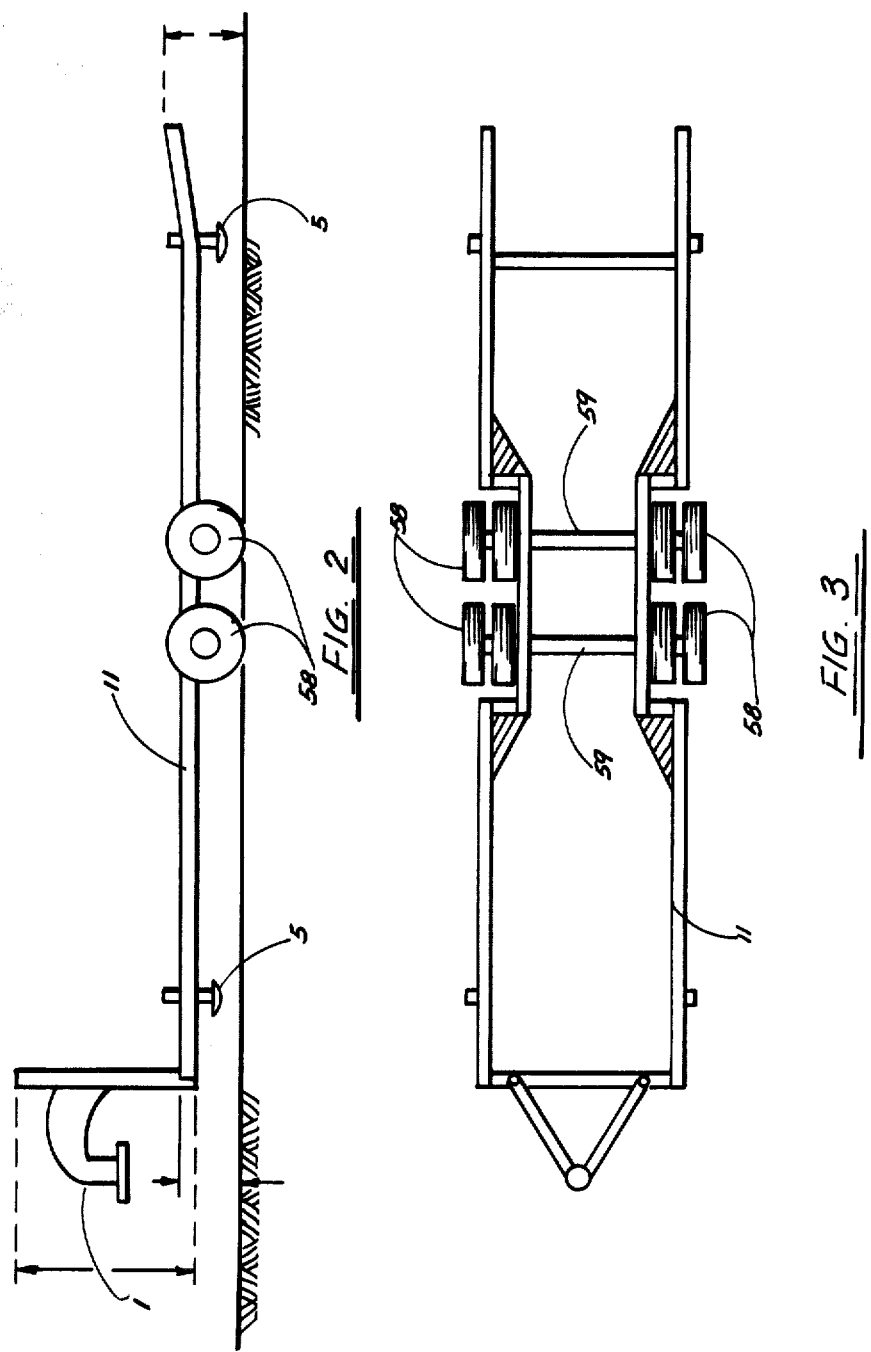

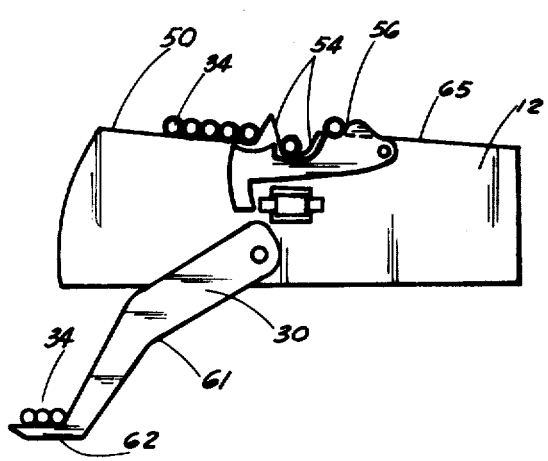
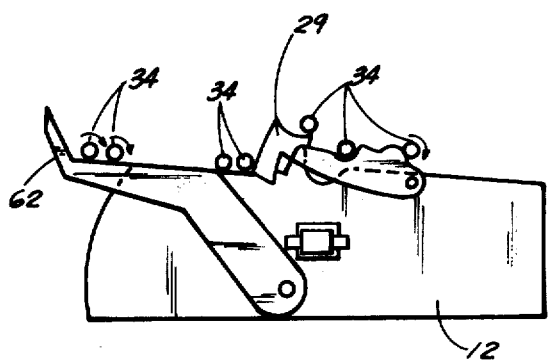
FIG. 5    FIG. 6
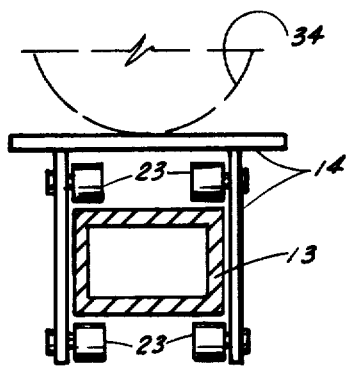
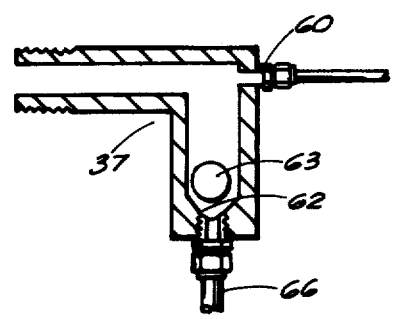
FIG. 7    FIG. 8
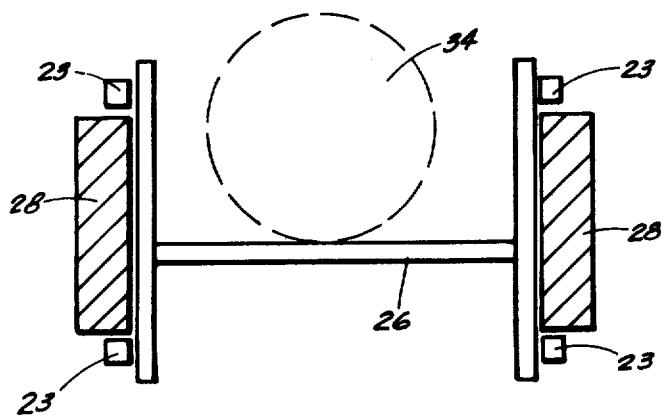
FIG. 9

AUTOMATIC PIPE TESTING UNIT

BACKGROUND OF THE INVENTION

1. Field of the Invention

The present invention relates to an advanced method and apparatus for automatically hydrostatically testing pipe and other tubular goods, especially drill pipe and production pipe in the context of oil-well drilling and production, which is operable by a single workman.

2. General Background

U.S. Pat. No. 3,710,628 issued to Herbert Horton entitled "Portable Automatic Pipe Testing Machine", discloses a portable automatic pipe testing machine comprising a longitudinally disposed main frame having pipe engaging spaced-apart arms attached thereto. Each arm has a claw located at one extremity thereof and the remaining end portion of each arm is pivotally attached to the frame. Spaced apart rotating heads are adapted to move towards and away from each other, longitudinally of the frame, to permit engagement with the terminal ends of the longitudinally disposed pipe which is to be tested. A source of pressurized fluid is adapted to flow into and out of at least one of the heads so as to hydrostatically test the interior of the pipe. The arms are arranged with respect to spaced apart pipe racks so as to enable the claw to be moved by the arm in a manner to engage a pipe on one rack, and to transfer the pipe into a location respective to the machine which enables each of the heads to be attached thereto. After the pipe has been tested, the heads are unfastened from the terminal ends of the pipe, and the claw then releases the pipe, where it moves by gravity on to the other pipe rack. The present invention accomplishes the same objectives as this invention but, the present invention embodies several novel features, which substantially advances the art.

U.S. Pat. No. 4,294,444 issued to Herbert Horton and entitled "Pipe Gripping Vise", teaches an improved vise for gripping elongated objects such as a pipe.

GENERAL DISCUSSION OF THE PRESENT INVENTION

Throughout this disclosure the term "pipe" or "joint" relates to tubular goods including drill pipe, production pipe, and various other metallic and non-metallic pipe and piping utilized to transfer fluids from one location to another, and for oil-well drilling.

In the context of oil-well drilling and production, once a pipe has been used downhole in a borehole, the structural integrity of the individual joints is questionable and accordingly there are many who are reluctant to reuse the pipe, although the vast majority of the joints of used pipe may be perfectly suitable for continued use. Accordingly, the pipe is subjected to pressure testing to assure that it is structurally sound and economically feasible for reuse, for otherwise one or more joints of pipe may fail after it has been reinstalled, thereby causing the entire pipe string to be prematurely removed from the borehole, thereby necessitating great costs and delays.

Accordingly, the present invention provides for an apparatus which automatically tests both used and new pipe, operable by a single workman so as to reduce the hazards of handling heavy pipe as well as the cost of testing. Moreover, the apparatus is operable in such a manner that never requires the operator to physically handle the pipe.

The present invention teaches those skilled in the art to construct or assemble an Automatic Pipe Testing Unit on a goose-neck trailer that will provide the operator and owner with the most economical, fastest and most efficient operation possible to date for the testing of tubular goods subjected to the high pressures of hydrostatic testing. The apparatus comprises a longitudinally extending rectangular tubing main trailer frame to which is constructed a test fluid holding tank with a screened opening to receive test fluid which is drained from each joint after it has been tested so that it can constantly be recirculated. The operator's cabin, which contains a hydraulic control panel for controlling the entire operation of the unit, is also mounted to the main frame. The unit also comprises two lift arms and two pipe advance arms which are hydraulically operated for lifting the pipe. It is important to note that the lift arms do not comprise hydraulic claw extensions, but rather a bevelled finger plate onto which a plurality of pipes can be rolled. The lift arms lift the pipes from one point (the ground or a rack, etc.) to a slanted storage area provided on the top of the unit and thence automatically, by operation of the hydraulic pipe advance arms, the pipe to be tested is advanced into a pipe gripping vise to be held for testing. The hydraulically operated pipe advance arms can then be operated by means of the push button hydraulic control panel inside of the operator's cabin to eject the pipe therefrom into another area for draining the pipe of all of the test fluid so that the test fluid can be recirculated for subsequent use.

Finally, after the pipe that has been tested has been drained, the positioning of the next pipe tested forces this pipe to be ejected from the drainage area onto the ground or another rack, etc.

Another object of the present invention is to provide improvements in pipe testing by the provision of a flow system for hydrostatically testing the pipe. In this regard, the present invention embodies several novel features, including a test fluid recirculating tank to receive the test fluid which is drained from each joint after it has been tested so that it can be constantly recirculated; a centrifugal recirculating test fluid pump for recirculating the test fluid, providing a low pressure, high volume system for filling pipe to be tested and for feeding a high pressure test fluid intensifier; a hydraulically driven test fluid pressure intensifier for intensifying the test fluid pressure inside of the pipe being tested.

It is still a further object of the present invention to provide novel end plates which provide (a) a sloped storage area for a multiple number of pipes to be tested, (b) a U-shaped position to hold a pipe in position to be tested, (c) a position to hold the last pipe tested while it drains all fluid contained therein back into the receiving trough and (d) a ramp to allow the pipe to roll off after it has been ejected from the drain position.

It is still a further object of the present invention to provide a rectangular extension beam which is extended and retracted by means of a hydraulic motor and sprocket mechanism—when the beam is in its extended position, the invention is in its working or operating position and, when the beam is in its retracted position, the invention is in its travelling position so that its length does not exceed any applicable highway or other regulations.

Various other objects and advantages of this invention will become readily apparent to those skilled in the art upon reading the detailed description and claims and referring to the accompanying drawings. The above objects are attained in accordance with the present invention by the provision of a combination of elements which are fabricated in a manner as above described.

BRIEF DESCRIPTION OF THE DRAWINGS

FIG. 2 is an elevated, frontal view of the main frame in isolation.

FIG. 3 is a top view of the main frame in isolation.

FIG. 5 is an elevated, frontal view of either end plate and one of the hydraulically-actuated lift arms, with pipes to be tested shown on the finger plate of the lift arm.

FIG. 6 is an elevated, frontal view of either end plate, depicting one of the lift arms in its most upward position rolling pipes to be tested onto the surface area provided on each end plate, and also depicting one of the hydraulically actuated pipe advance arms advancing a pipe to be tested into the testing position provided on top of the end plate, and a tested pipe into the draining position provided on the end plate, and advancing an already drained pipe to the inclined ramp provided on the end plate, for ejection from the unit.

FIG. 7 is an end view of the rear rotating head carriage, the extension beam on which the rear rotating head travels being shown in cross-section.

FIG. 8 is a cross-sectional, elevated frontal view of the test fluid entry valve, depicting the low pressure test fluid fill hose leading into the bottom thereof, and the high pressure port provided near the top thereof.

FIG. 9 is a cross-sectional end view of the track mounted in the receiving trough, and an end view of the front rotating head carriage, mounted on cam followers, travelling thereon.

DETAILED DESCRIPTION OF THE PREFERRED EMBODIMENT

Figure 1:
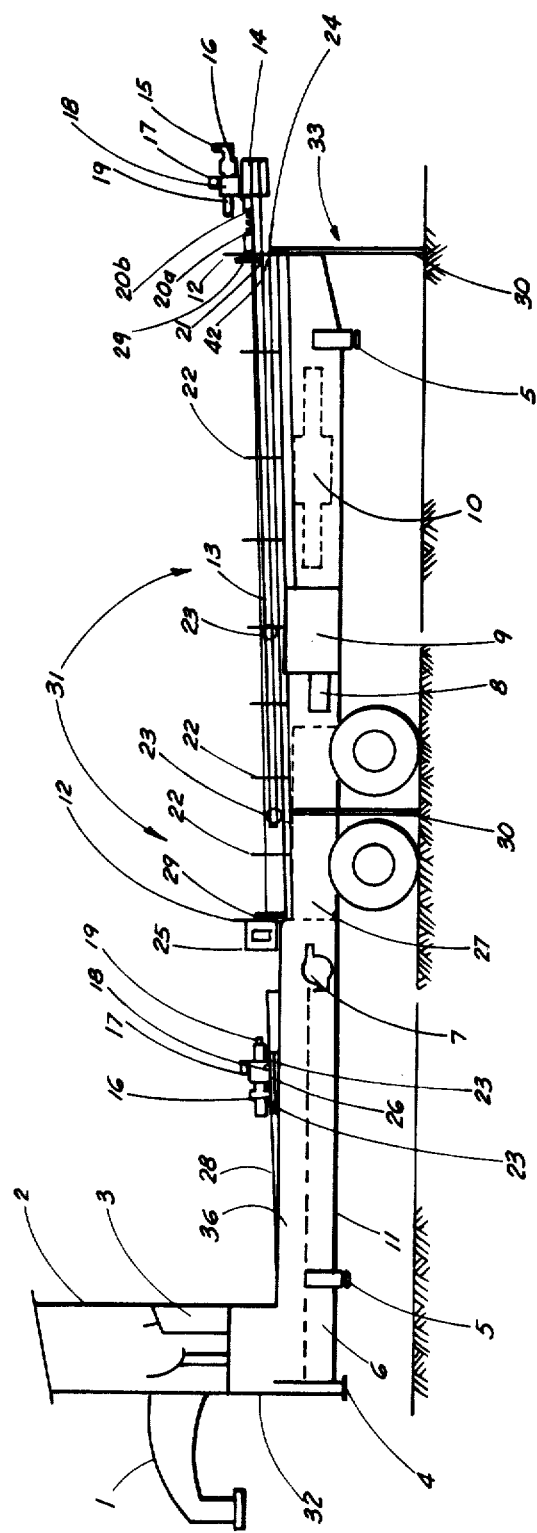
FIG. 1 is an elevated, frontal view of the entire apparatus of the present invention.

As seen in the drawings and, in particular, FIG. 1, the arrow at numeral 31 generally indicates an Automatic Pipe Testing unit made in accordance with the present invention. The apparatus is seen to include a longitudinally disposed rectangular tubing main frame 11 which can be a basic trailer with two heavy duty axles 59, each having one or more wheels 58 on each end thereof, as best seen in FIGS. 2 and 3. A gooseneck extension 1 is welded to the operator's cabin 2 at the front end of frame 11 for mounting a miniature fifth wheel (not shown) used as the connection between trailer 11 and the towing vehicle (not shown). The apparatus, however, can be constructed without any wheels for skid mounting, if preferred.

As seen in FIG. 1, numeral 32 indicates the forward end of the apparatus. The rearward end of the apparatus is generally indicated by the arrow at numeral 33.

Figure 4:
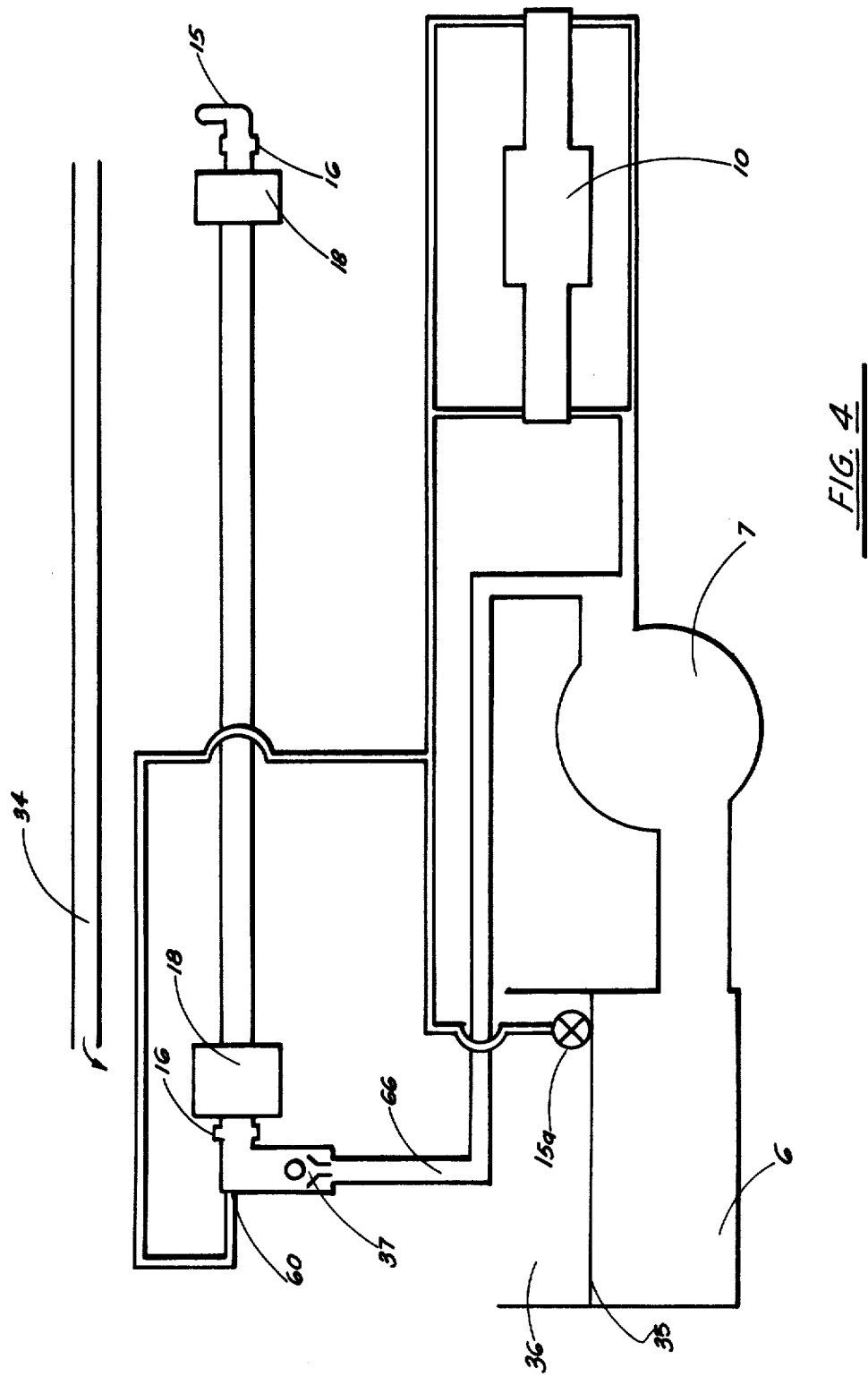
FIG. 4 is a schematic diagram of the test fluid recirculating and test fluid pressure intensifier system.

As seen in FIGS. 1 and 4, on the front end 32 of trailer 11 is constructed a test fluid holding tank 6, the top of which is provided with a screened opening 35, as seen in FIG. 4, to receive the test fluid which is drained from each joint of pipe 34 after it has been tested so that it can constantly be recirculated. Above this holding tank 6 is constructed an open-topped receiving trough 36 as best seen in FIG. 4, which catches the aforementioned test fluid, and in which a track 28 is constructed to provide a means for the travel of a front rotating head carriage 26 to and from the end of joints of pipe 34 to be tested. Above this trough 36 is also constructed operator's cabin 2 which contains a seat and hydraulic control panel 3 provided with gauges and recorders (not shown) for determining test pressures and hydraulic system pressures that control the operation of the unit.

Figure 10:
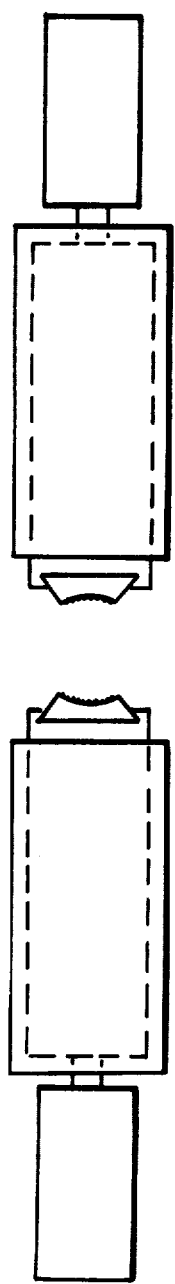
FIG. 10 is an isolated, frontal view of the pipe gripping vise of the present invention.
Figure 12:
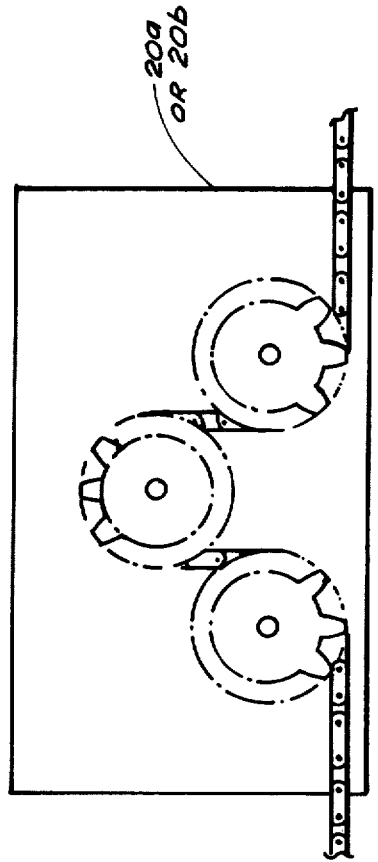
FIG. 12 is an isolated, frontal view of the motor-and-sprocket arrangement which moves the rotating head carriage.
Figure 11:
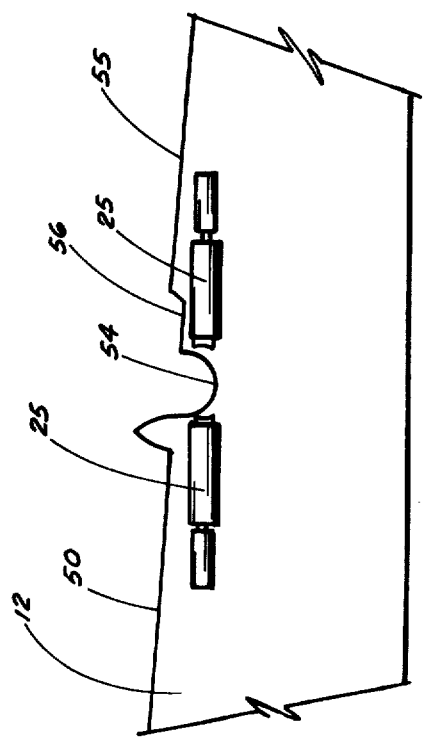
FIG. 11 is an elevated, frontal view of the end plate with the pipe gripping vise mounted thereto.
Figure 15:
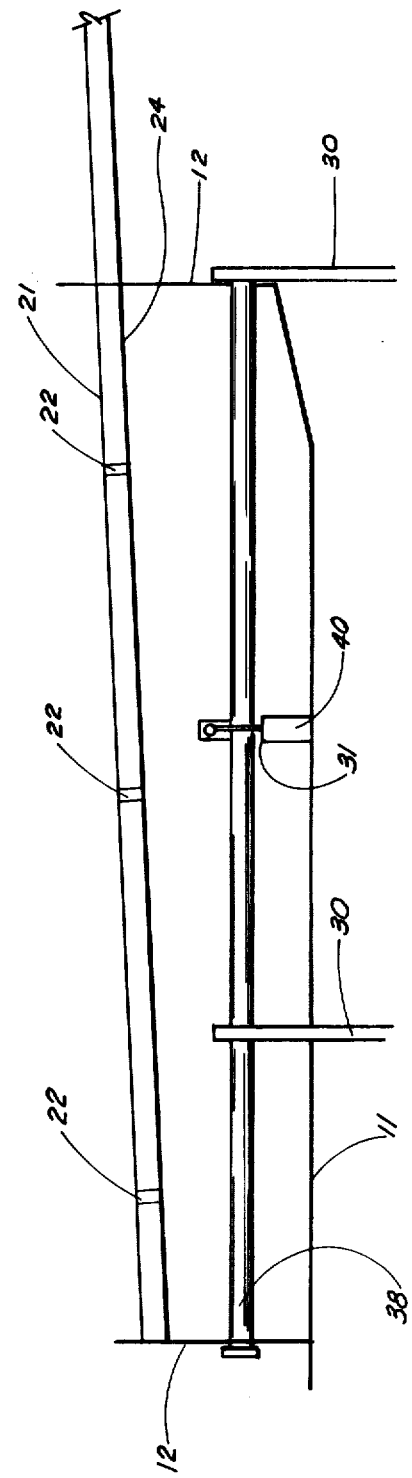
FIG. 15 is an elevated, frontal view of the tubing swivelly connected between the front and rear end plates, and the lift arms connected thereto, as well as the piston-and-cylinder arrangement which rotates the tubing in order to actuate the lift arms; Also shown is the angle iron track.

As seen in FIGS. 1 and 4, mounted to main frame 11 rearward of test fluid holding tank 6 is a centrifugal test fluid pump 7 for recirculating the test fluid, providing a low pressure, high volume fluid system for filling pipes to be tested and for feeding the inlet side of high pressure test fluid intensifier 10. As seen in FIGS. 1, 5, 6, 11, and 15 a steel end plate 12 is welded, perpendicularly, to the base of the main frame 11, in front of the front wheel and also on the rear end of trailer 11, rising vertically therefrom and extending through the top of main frame 11, providing a pipe support means, for the pipe 34 to be tested. A pipe gripping vise 25, as best seen in FIGS. 10 and 11 is constructed on the front side of front end plate 12. As seen in FIGS. 5 and 6, front and rear end plates 12 are designed on the top to provide (a) a storage area 50 for a multiple number of pipes to be tested, (b) a U-shaped position 54 to hold a pipe in position to facilitiate testing thereof, (c) a position 56 to hold the last pipe tested while it drains all fluid contained therein back into the receiving trough 36 and (d) a ramp 55 to allow the pipe to roll off the unit after it has been ejected from the drain position 56. Between the two end plates 12 is welded an angle iron track 21, as seen in FIGS. 1 and 15. A rectangular stiffening beam 24, which is the base of the angle iron track 21 is welded perpendicularly, between the two end plates 18. Welded perpendicularly to stiffening beam 24, so as to rise vertically therefrom, is a plurality of evenly-spaced steel support plates 22, which provide added support for the angle iron track 21. This angle iron track 21 is designed to provide a housing to contain an extrusion beam 13, as seen in cross-section in FIG. 7, which allows the unit to be extended in length to accomodate Range II pipe (±30 feet long) while allowing the unit to be contracted so as to meet federal and state highway length limitations. The extension beam 13 is extended and contracted by means of a hydraulic motor and sprocket mechanism 20a, as seen in isolation in FIG. 12. Once in the desired position, the beam 13 is pinned in place. On the extension beam 13 is constructed a rear rotating head carriage 14 which is moved back and forth by means of another hydraulic motor and sprocket mechanism 20b similar to the hydraulic motor and sprocket mechanism 20a used in extending and contracting the extension beam 13 and travelling along the same chain.

Figure 14:
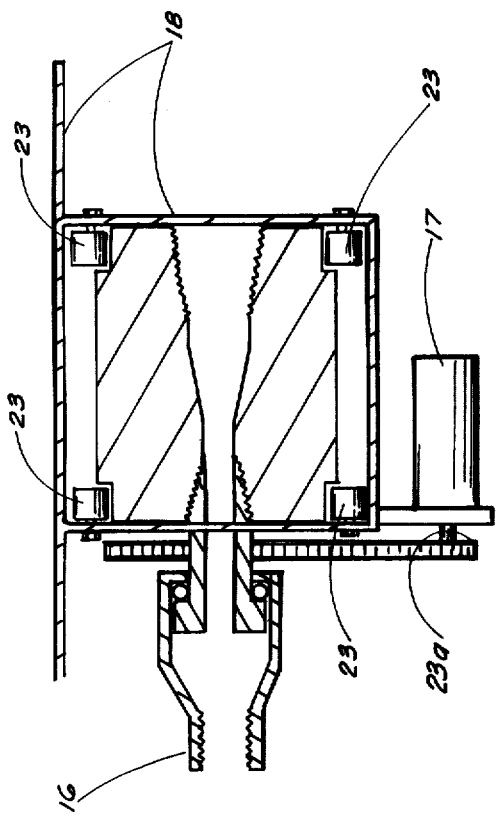
FIG. 14 is a partially cross-sectional, elevated, frontal view of the hydraulic motor and sprocket mechanism which rotates either rotating head.
Figure 13:
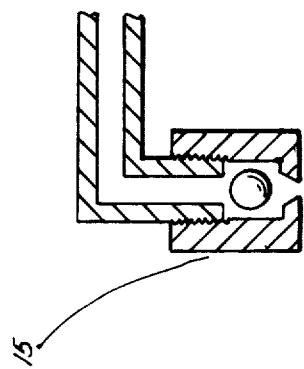
FIG. 13 is an isolated, cross-sectional, frontal view of the air bleed-off valve.

A rear rotating head carriage 14 is mounted on the extension beam 13, and is designed to move back and forth on the angle iron track 21, as seen in FIGS. 1 and 7. A front rotating head carriage 26 is mounted in trough 36 and is designed to move back and forth on angle iron track 28. As seen in FIGS. 1, 7, and 9 on top of both rear rotating head carriage 14 and front rotating head carriage 26 are constructed rotating heads 18 which are mounted on cam followers 23 and which are rotated by hydraulic motors 17 through a chain and sprocket arrangement 23a, as best seen in FIG. 14, designed to deliver the rotational speed and torque desired. Hydraulic motors 17 are high torque, low speed devices and have the usual pressure and suction attachments (not shown) associated therewith so as to provide power fluid for causing motor 17 to rotate. Hydraulic motors 17 are mounted above front and rear rotating heads 18, so as to, by means of a chain drive, controllably rotate each head 18 in either a clockwise or counterclockwise direction, depending upon the direction of controlled fluid flow. Both rotating heads 18 are round, solid steel provided with threading on the front thereof to threadably engage the threaded end of a test sub 19, and threaded on the back to threadably engage one end of a standard high pressure (or specially constructed for additional pressure capability) swivel 16. The test subs 19 are short subs threaded on one end to connect to the front of the rotating heads 18 and threaded on the other end to threadably engage the pipe 34 to be tested. As seen in FIGS. 4, 13, and 14, screwed into swivel 16, mounted on the back of rear rotating head 18, is a standard high pressure ball and seat check valve 15, or air bleed-off valve 15 as best seen in FIGS. 4 and 13 with any provided springs removed to allow for all the air in a joint of pipe 34 to be vented while it is being filled with test fluid. Into swivel 16 screwed into the front of front rotating head 18 is screwed a test fluid entry valve 37, as can be seen in FIGS. 4, and 8, and 13, which consists of an entry for low pressure test fluid which is being pumped thereinto by centrifugal recirculating pump 7 through low pressure fill hose 66, as seen in FIG. 4, to pass an upward facing seat 62 and a ball 63 designed to seal off seat 62, thence on through swivel 16, head 18, and ultimately into the pipe 34 to be tested. Once the pipe 34 has been filled with test fluid and no more test fluid is passing through the seat and past the ball of the valve 37, ball 63 is designed to go on seat 62 due to gravity and the no-flow condition existing in the ball and seat cavity. At this point, a conventional ball valve (not shown) connected to the centrifugal pump 7 is closed, thereby prohibiting pump 7 from filling up pipe 34. This ball valve is opened when it is desired to resume filling operations. At this point, the operator activates the test fluid pressure intensifier 10 which is connected to a high pressure port 60 in the test fluid entry valve 17 located at some point above the ball and seat. The test fluid pressure intensifier 10 is mounted to the base of main frame 11 adjacent to motor 9 and hydraulic pump 8, which powers it. This pressure serves to further force the ball of the test fluid entry valve 37 on seat against the low pressure fluid system and build the desired pressure on the inside of the pipe 34 being tested.

As seen in FIG. 15, a round tubing length 38 is rotatably connected to both end plates 12 parallel to the base of main frame 11. The tubing 38 extends slightly through each end plate 12. Two hydraulic lift arms 30 are swivelly connected to tubing 38 so as to extend vertically downward from (1) a point between the wheels 58, and (2) from the part of tubing 38 extending through the rear end plate 12. Each hydraulic lift arm 30 extends downwardly in a diagonal fashion and has a slight elbow 61 near the middle, as best seen in FIG. 5. Welded perpendicularly to the base of each lift arm 30 is a finger plate 62, which is bevelled to allow the pipe to be tested to roll thereon. A piston-and-cylinder arrangement 31 is swivelly mounted to tubing 38 between the two lift arms 30, cylinder 40 being mounted to the base of main frame 11. A hydraulic pump 8, powered by motor 9, pumps hydraulic fluid from hydraulic fluid tank 27 to piston-and-cylinder arrangement 31. The hydraulic pump 8 and the combustible or electric motor 9 which powers it are both mounted to the base of main frame 11 between end plates 12. Hydraulic fluid tank 27 is a generally rectangular container mounted to the base of main frame 11 between front end plate 12 and hydraulic pump 8, as best seen in FIGS. 1 and 4. It should be noted at this point that all of the hydraulic motors 17, 20a, 20b, and the hydraulic pump 8, and piston-and-cylinder arrangement 39, etc. are controlled by means of a hydraulic control panel 3 mounted within the operator's cabin 2. The operator then pushes the appropriate buttons on hydraulic control panel 3 to actuate piston-and-cylinder arrangement 31 (i.e., the piston reciprocates in the cylinder), thus causing tubing 38 to rotate, thereby causing lift arms 30 to move upwardly in an arcuated fashion (approximately 90° arc), the movement of lift arms 30 can be seen in FIGS. 5 and 6, In this manner, lift arms 30 pick pipe 34 for testing off the ground or a pipe rack and deliver it onto the sloped storage area 50 on top of end plates 12. Directly above tubing 38 and parallel to the base of main frame 11, another tubing 42, similar to tubing 38, is rotatably mounted, at either end, to end plates 12, extending slightly through each end plate 12. A hydraulic pipe advance arm 29 is swivelly mounted near either end of tubing 42, at a point just before tubing 42 intersects either end plate 12. A piston-and-cylinder arrangement not shown 43, similar to the piston-and-cylinder arrangement 31, is swivelly mounted to tubing 42 between the two pipe advance arms 29. Hydraulic pump 8, powered by motor 9, pumps hydraulic fluid from the hydraulic fluid tank 27 to the piston-and-cylinder arrangement (not shown). The operator then pushes the appropriate buttons on hydraulic control panel 3 to actuate the piston-and-cylinder arrangement (i.e., the piston reciprocates in the cylinder), thereby causing tubing 42 to rotate, thereby causing pipe advance arms 29 to move upwardly in an arcuated fashion, as best seen in FIG. 6. There are three different positions that pipe advance arms 29 can engage in as they go through their arcuated path so that they serve the purpose of moving the pipe to be tested from the sloped storage area 50 to the test position 54, as seen in FIGS. 5 and 6, from the test position to the drainage position 56 and finally from the drainage position the now tested, drained pipe is ejected and allowed to roll off the unit onto the ground or any receiving structure.

It should be noted that by a combined use of hydraulic jack 4, mounted to the bottom of the front end of main frame 11, and two or more screw-type levelling jacks 5, mounted to the bottom of the base of main frame 11 near either end thereof, the unit is made to be level from side-to-side and sloping lengthwise so that the front end is lower than the rear end, to facilitate draining tested pipe, etc. The operator's experience will determine the angle of this slope.

The method of operation of the invention is as follows:

1. The unit 31 is pulled onto location by a truck or other towing vehicle and positioned parallel to the pipe 34 to be tested.

2. By combined use of hydraulic jack 4, and screw type levelling jacks 5, the unit is made to be level from side to side and sloping lengthwise so that the front end is lower than the rear end; the operator's experience will determine this angle of slope. Extension beam 13 is fully extended into the working position and locked or pinned.

3. The hydraulically operated lift arms 30 are lowered as low as necessary (to the ground if needed) where a multiple number of joints of pipe to be tested are rolled onto finger plates 62 of lift arms 30.

4. Lift arms 30 are then raised so that these joints are allowed to roll onto the storage area 50 provided by the two end plates 12. Lift arms 30 are then lowered where more joints to be tested can be rolled into position for future raising to the storage area 50.

5. The hydraulically operated pipe advance arms 29 are then actuated to pick up the first joint of pipe from the storage area and place it into the U-shaped slot 54 provided for holding a joint while it is being tested. At this point, pipe gripping vise 25 is closed to hold the joint of pipe 34 firm against rotational forces.

6. Hydraulic motor 17 which rotates the test heads 18 and their attached test subs 19, as well as motor-and-sprocket arrangements 20b that move rotating head carriages 14, 26, are actuated in the appropriate direction to simultaneously move the test subs 19 into contact with the joint 34 to be tested and screw subs 19 into its ends.

7. While this operation is in progress, centrifugal recirculating pump 7 is allowed to be filling the joint to be tested with test fluid through low pressure fill hose 66 and the test fluid entry valve 37 screwed into the swivel 16 mounted on the back of front rotating head 18. During this operation, the entrapped air is being bled out through the air bleed-off valve 15 attached behind swivel 16 mounted to the rear of rear rotating head 18. The low pressure test fluid being pumped by centrifugal recirculating pump 7 passes the upward facing seat 62 of the fluid entry valve 37 and a ball 63 designed to seal off said seat 62, thence on through swivel 16, head 18, and ultimately into the pipe 34 to be tested.

8. When the joint 34 to be tested is filled, the ball (not shown) in the air bleed-off valve 15 will be forced on seat (not shown) by the test fluid and due to the no flow condition the ball 63 in the test fluid entry valve 37 will fall on seat 62 due to gravitational forces.

9. At this point, the operator activates the hydraulically driven test fluid pressure intensifier 10, which is connected to high pressure port 60 in test fluid entry valve 37 located at some point abave the ball 63 and seat 62 thereof, thus raising the pressure in the joint 34 to the pressure desired.

10. When the operator is satisfied with the integrity of this joint of pipe 34, he opens the hydraulically operated bleed-off valve 15a and the pressure is immediately released into test fluid return trough 36. The test fluid entry valve 37 is reopened immediately upon front rotating head 18 coming into contact with the next joint to be tested, due to the flow from centrifugal pump.

11. Step 6 is then repeated except in reverse to remove test subs 19 from the ends of the joint that has been tested and to move roatating heads 18 out of the way to allow for the removal of this joint and the admission of the next joint to be tested.

12. Pipe gripping vise 25 is then shifted to the open position. The hydraulic system is so designed that pipe advance arms 29 (next operation) will not operate unless this operation is first performed.

13. The operator then operates the hydraulically actuated pipe advance arms 29 causing the joint that has just been tested to move into the drain position 56 and the next joint to be tested to move into the U-shaped slot 54 provided in the pipe gripping vise 25 to hold a joint to be tested. All pipe in the storage area 50 moves down one position at this time.

14. This procedure is repeated until all joints have been tested with the additional movement that occurs when the third joint is moved into position to be tested by the pipe advance arms 29—namely that the first joint which was by now in the drain position 56, is ejected by hydraulically actuated pipe advance arms 29 from that position and allowed to roll off the side of the unit. From this point on, each actuation of pipe advance arms 29 advances three joints of pipe simultaneously, which is novel in the art.

15. On completion of all pipe being tested, hydraulic jacks 4 is used to remove weight from screw-type jack 5 which are retracted. The unit is reconnected to the towing vehicle and pulled off location.

What is claimed as invention is:

1. An automatic pipe testing unit, comprising:
    a. a main frame;
    b. a test fluid tank mounted to said main frame, said tank being provided with means for receiving test fluid;
    c. a recirculating test fluid pump mounted to said main frame adjacent to said test fluid tank;
    d. an open-topped receiving trough mounted on said main frame adjacent to said test fluid tank;
    e. a hydraulic pump connected to a power source, said pump and said power source being mounted to said main frame adjacent to said recirculating test fluid pump;
    f. a hydraulically driven test fluid pressure intensifier mounted to said main frame adjacent to said hydraulic pump;
    g. front and rear rotating head carriages;
    h. front and rear rotating heads mounted to said front and rear rotating head carriage, respectively;
    i. a swivel connection means provided with a test fluid entry ball valve mated to said front rotation head and a swivel connection means provided with an air bleed-off valve mated to said rear rotating head;
    j. a means for turning said rotating heads;
    k. front and rear test subs screwed into said front and rear rotating heads, respectively;
    l. a track disposed on said main frame for facilitating back and forth movement of said front roatating head carriage;
    m. an angle iron track disposed on said main frame for facilitating back and forth movement of said rear rotating head carriage;
    n. means for moving said front and rear rotating head carriages back and forth along their respective tracks for mating said test subs with said pipe to be tested;

o. an extendible and retractable extension beam housed by said angle iron track, wherein said extension beam provides means for extending and retracting said automatic pipe testing unit;

p. front and rear end plates mounted to said main frame, said end plates each being provided with a multi-position surface area for storing, testing, draining, and ejecting pipe;

q. hydraulically driven lift arms disposed on said main frame for picking up said pipe to be tested and delivering it to said surface area of said end plates, wherein said lift arms are provided with means for lifting a multiple number of pipes for testing;

r. hydraulically driven pipe advance arms disposed on said main frame for moving said pipe into the various positions on said surface area of said end plates.

2. The apparatus of claim 1, wherein said main frame is a longitudinally disposed rectangular tubing main frame with heavy-duty axles each having at least one wheel on each end thereof.

3. The apparatus of claim 1, wherein hydraulic and screw-type levelling jacks are disposed underneath said main frame for setting up said automatic pipe testing unit for operation.

4. The apparatus of claim 1, wherein it further comprises an operator's cabin with hydraulic control panels mounted on said main frame.

5. The apparatus of claim 1, wherein said recirculating test fluid pump is a centrifugal, hydraulically-driven pump.

6. The apparatus of claim 1, wherein said means for turning said rotating heads are hydraulic motors which turn said rotating heads by means of a chain drive.

7. The apparatus of claim 1, wherein said means for moving said rotating head carriages back and forth along their respective tracks are hydraulic motor and sprocket mechanisms.

8. The apparatus of claim 1, wherein said hydraulically driven lift arms comprise a bevelled finger plate attached to their lower end for lifting a multiple number of pipes for testing.

9. The apparatus of claim 1, wherein said angle iron track is welded between said front and rear end plates, parallel to the base of said main frame, and comprises:

a. a rectangular stiffening beam, such as the base of said angle iron track, fixably mounted between said front and rear end plates, substantially parallel to the base of said maid frame;

b. a plurality of evenly-spaced support plates mounted to said stiffening beam and rising substantially vertically therefrom, thereby providing added support for said angle iron track;

c. a housing containing said extension beam which allows the unit to be extended in length to accommodate lengthly pipe, while allowing said automatic pipe testing unit to be contracted;

d. a hydraulic motor and sprocket mechanism which is chain driven, said mechanism extending and contracting said extension beam.

10. The apparatus of claim 1, wherein said track facilitating back and forth movement of said front rotating head carriage is mounted in said receiving trough.

11. The apparatus of claim 1, wherein said front and rear rotating heads are mounted on top of said front and rear rotating head carriages, respectively; said front and rear rotating heads are mounted on cam followers and are rotated by said hydraulic motors through a chain and sprocket arrangement designed to deliver the rotational speed and torque desired.

12. The apparatus of claim 1, wherein both rotating heads are round, solid steel provided with threading on the front thereof to threadably engage the threaded end of said test sub and threading on the back thereof to threadably engage said swivel.

13. The apparatus of claim 1, wherein a test fluid entry valve is screwed into said swivel connection means mated to the back of said front rotating head, thereby allowing entry of low pressure test fluid being pumped by said recirculating test fluid pump.

14. The apparatus of claim 1, wherein said front and rear end plates are each provided with a multi-position surface area comprising:

a. a storage area for a multiple number of pipes to be tested;

b. a U-shaped position to hold a pipe in position to facilitate testing thereof;

c. a position to hold the last pipe tested while it drains all fluid contained therein back into said receiving trough;

d. a ramp to allow the pipe to roll off the unit after it has been ejected from the drained position.

15. The apparatus of claim 1, wherein said hydraulically driven test fluid pressure intensifier is connected to said test fluid entry ball valve mated to said swivel connection means of said front rotating head.

* * * * *